(12) United States Patent
Ubale (10) Patent No.: US 11,872,918 B2
(45) Date of Patent: Jan. 16, 2024

(54) AUTOMOTIVE SEAT WITH SELF-FOLDING ARMREST

(71) Applicant: FAURECIA AUTOMOTIVE SEATING, LLC, Auburn Hills, MI (US)

(72) Inventor: Sachin Ubale, Troy, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 17/746,102

(22) Filed: May 17, 2022

(65) Prior Publication Data

US 2023/0373368 A1 Nov. 23, 2023

(51) Int. Cl.
*B60N 2/30* (2006.01)
*B60N 2/75* (2018.01)
*B60N 2/20* (2006.01)

(52) U.S. Cl.
CPC ............. *B60N 2/753* (2018.02); *B60N 2/20* (2013.01); *B60N 2/30* (2013.01); *B60N 2/3011* (2013.01); *B60N 2/767* (2018.02)

(58) Field of Classification Search
CPC ........ B60N 2/3011; B60N 2/767; B60N 2/30; B60N 2/3002; B60N 2/3004; B60N 2/753
See application file for complete search history.

(56) References Cited

U.S. PATENT DOCUMENTS 9,278,638 B2 * 3/2016 Tsuchida ............... B60N 3/002

FOREIGN PATENT DOCUMENTS

| DE | 3110515 C2 | 5/1987 | |
| DE | 102004055257 A1 * | 5/2006 | ............. B60N 2/206 |
| DE | 102004055257 A1 | 5/2006 | |
| DE | 102006023038 B4 | 4/2008 | |

* cited by examiner

*Primary Examiner* — Syed A Islam
(74) *Attorney, Agent, or Firm* — Barnes & Thornburg LLP (57) ABSTRACT

An automotive seat has a self-folding armrest to facilitate automated and complete folding of the armrest upon folding the seat. As such, at least one armrest is pivotally coupled to one side of the backrest, wherein the at least one armrest has a bottom surface. The seat comprises at least one guiding member adapted to be coupled to each side of a seat bottom where there is an armrest. The guiding member comprises an upper surface, such that folding of the backrest towards the seat bottom results in sliding of the bottom surface of the armrest over the upper surface of the guiding member. This facilitates automated folding of the armrest with respect to the backrest, without requiring any additional mechanism, and restricting contact of the armrest with a floor of the vehicle.

20 Claims, 6 Drawing Sheets

AUTOMOTIVE SEAT WITH SELF-FOLDING ARMREST

TECHNICAL FIELD

The present disclosure relates to the field of vehicle seats. More particularly the present disclosure relates to an automotive seat with a self-folding armrest, which facilitates complete and automated folding of the armrest while folding the seat, and without requiring any additional mechanism.

BACKGROUND

Background description includes information that may be useful in understanding the present disclosure. It is not an admission that any of the information provided herein is prior art or relevant to the presently claimed subject matter, or that any publication specifically or implicitly referenced is prior art.

Figure 1A:
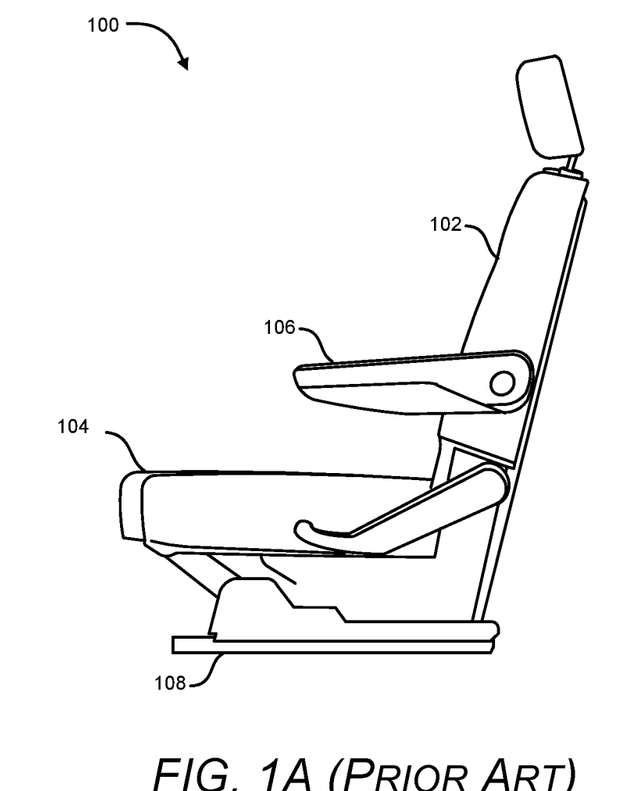
FIGS. 1A and 1B illustrate an exemplary representation of a conventional seat in a seating position and a loading position, respectively.
Figure 1B:
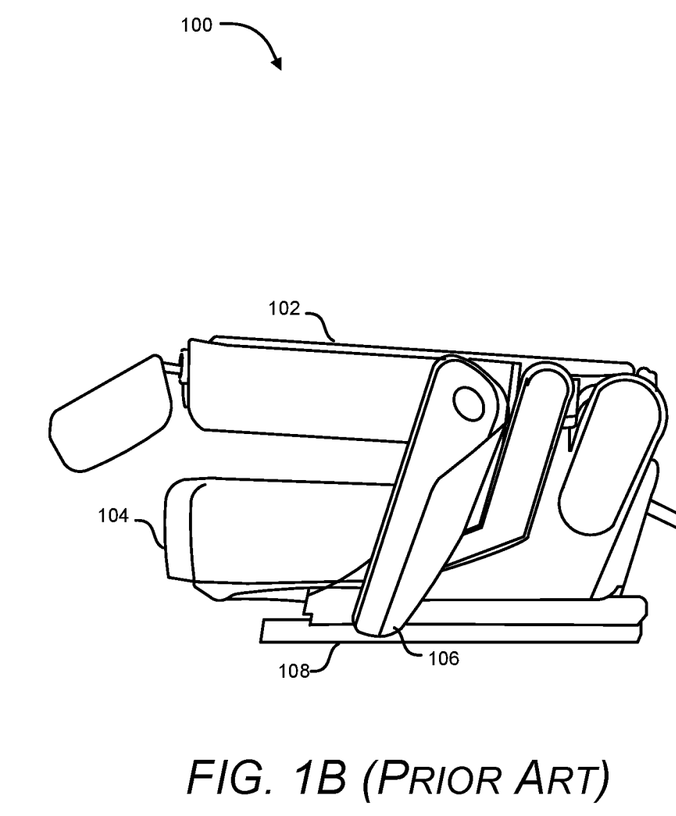

Conventionally, seats of vehicles are foldable to allow a user to fold rear seats when they are not in use. A backrest 102 of the seat 100 is foldably coupled to a seat cushion 104 or bottom of the seat 100, such that the backrest 102 may be pushed towards the seat cushion 104 in a loading or non-seating position as shown in FIG. 1B, and the backrest 102 may be extended away from the seat bottom 104 in a seating position as shown in FIG. 1A. The user can move the backrest 102 to the loading position to increase or extend the storage space or loading area of the vehicle. Generally, the rear seats of the vehicle are folded to increase or extend the storage space or loading area, which may be later unfolded to the seating position to allow users to sit on the rear seats. Existing seats are further provided with an armrest 106 connected on each side of the backrest 102. The armrests 106 are generally kept perpendicular to the backrest 102 so that the armrests 106 may remain substantially horizontal when the backrest 102 is in the seating position, allowing the user to rest their arms while sitting on the seat. However, the existing armrest 106 and seats have some drawbacks, shortcomings, and limitations.

One of the major drawbacks associated with existing seats 100 is that while folding the backrest 102 downward towards the seat bottom 104, the armrests 106 still remain perpendicular to the backrest 102. As a result, the armrests 106 also move or rotate in the downward direction, thereby getting obstructed by or stuck in the floor 108 beneath the seat or with other parts of the seat bottom 104. This obstruction of the armrest 106 while folding the backrest 102 restricts the complete folding of the backrest 102 towards the seat bottom 104 as shown in FIG. 1B, which limits the provision of a generally flat extended loading area or storage space in the vehicle. Additionally, this obstruction may also damage the armrest as well as the seat during folding. Some of the existing seats are provided with an additional mechanism fitted in the armrest to allow folding of the armrest before folding the seat. However, such a mechanism requires the users to manually fold the armrest every time before folding the seat and again to manually unfold the armrest after unfolding the seat, which is inconvenient for the users. Also, the additional mechanism and associated components make the overall seat bulky, complex, and costly, which makes it prone to failure and requires frequent maintenance.

SUMMARY

The subject disclosure provides a simple and cost-effective arrangement for the complete folding of armrests and seats, without requiring any additional mechanism, so that when the backrest is folded towards the seat bottom, the armrest is automatically and completely folded without being obstructed, which allows the seat to be completely folded. Additionally, when the backrest is unfolded away from the seat bottom, the armrest is automatically and completely extended to a use position.

Thus, the present disclosure comprises a simple and cost-effective seat with a self-folding armrest that is automatically and completely folded without getting obstructed during folding and without requiring an additional arm-folding mechanism.

In one disclosed example, an automotive seat may include a backrest foldably coupled to a seat bottom, and an armrest pivotally coupled on at least one side of the backrest, or on each side of the backrest. The seat may further include a guiding member (also referred to as a guiding shield) adapted to be coupled on each side of the seat bottom of the seat that has an armrest. The guiding member may also act as a shield for a connection point between the backrest and the seat bottom of the seat. In one example, the guiding member may have an upper surface having a predefined profile complementary to a profile of a bottom surface of the armrest, such that folding of the backrest towards the seat bottom results in sliding of the bottom surface of the armrest over the upper surface of the guiding member, which facilitates automated folding of the armrest with respect to the backrest and restricting contact of the armrest with a floor of the vehicle. The upper surface of the guiding member may have a first surface oriented substantially parallel to a length of the seat bottom, and a second surface inclined at a first predefined acute angle with respect to an axis of the first surface such that a smooth curved profile is created between the first surface and the second surface on the upper surface of the guiding member. The first surface may extend towards a first end of guiding member that is connected to the seat bottom and the second surface may extend from the first surface towards a second end (opposite to the first end) of the guiding member, such that the guiding member does not provide any obstruction to the backrest or seat bottom while the movement of the backrest with respect to the seat bottom.

Accordingly, when the backrest is moved towards the seat bottom (towards loading or folded position) while folding the seat, the bottom surface of the armrest slides over the upper surface of the guiding member, thereby causing rotation of the armrest in an upward direction, about a pivot point on the backrest, towards the backrest, which facilitates automated and complete folding of the armrest with respect to the backrest. Further, when the backrest is moved away from the seat bottom (towards seating or unfolded position) while unfolding the seat, the armrest rotates in the downward direction about the pivot point, away from the backrest, which facilitates the automated unfolding of the armrest where the armrest again becomes substantially horizontal, allowing the user to access the armrest.

Thus, the unique profile of the upper surface of the proposed guiding member or guiding shield enables automated and complete folding and unfolding of the armrest while moving the backrest between the loading position and seating position, respectively, without requiring any additional mechanism and without any obstruction.

In an aspect, once the backrest moves to the seating position, the armrest may become substantially horizontal. Further, the pivot point on the backrest may be configured to restrict the movement of the armrest in the downward direction from the substantially horizontal position. However, the pivot point may allow the movement of the armrest between the substantially horizontal position and a substantially vertical position where the armrest comes in line with the backrest, to adjust the armrest as required by the user.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

Various terms are used herein. To the extent a term used in a claim is not defined below, it should be given the broadest definition persons in the pertinent art have given that term as reflected in printed publications and issued patents at the time of filing.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the disclosed subject matter and does not pose a limitation on the scope of the disclosure otherwise claimed. No language in the specification should be construed as indicating any non-claimed element essential to the practice of the disclosure.

Groupings of alternative elements or embodiments of the subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

According to an aspect, the present disclosure elaborates upon a simple and cost-effective automotive seat with a self-folding armrest, wherein the armrest gets automatically and completely folded without getting obstructed while folding the seat, and without requiring any additional mechanism.

In an embodiment, the automotive seat can include a backrest foldably coupled to a seat bottom. Further, an armrest can be pivotally coupled on each side of the backrest. The guiding assembly can include a guiding member adapted to be coupled to the sides of the seat bottom. Sliding contact between an upper surface of the guiding member and a bottom surface of the armrest causes the armrest to automatically move to an arm folded position as the backrest is moved to a seat folded position. In one example, the guiding member can include an upper surface having a predefined profile complementary to a profile of a bottom surface of the armrest, such that folding of the backrest towards the seat bottom results in sliding of the bottom surface of the armrest over the upper surface of the guiding member, which facilitates automated folding of the armrest with respect to the backrest and restricting contact of the armrest with a floor of the vehicle.

In an embodiment, the upper surface of the guiding member can include a first surface oriented substantially parallel to a length of the seat bottom, and a second surface inclined at a first predefined acute angle with respect to an axis of the first surface. The first surface can extend towards a first end of the guiding member that can be connected to the seat bottom and the second surface extends from the first surface towards the second end of the guiding member.

In an embodiment, the second surface can be inclined at the first predefined angle with respect to the first surface such that a smooth curved profile is created between the first surface and the second surface.

In an embodiment, at least a portion of the bottom surface of the armrest can have a curved profile that can be adapted to come in contact and slide with the second surface of the guiding member.

In an embodiment, the guiding member can be configured to act as a shield for a connection between the backrest and the seat bottom.

In an embodiment, the backrest can be foldably coupled to the seat bottom and configured to move between a folded position and a seating position. The folded position can correspond to a position where the backrest and the seat bottom become substantially parallel, and the seating position can correspond to a position where the backrest is inclined at a second predefined angle relative to the seat bottom.

In an embodiment, the movement of the backrest towards the folded position can result in sliding of the bottom surface of the armrest over the upper surface of the guiding member, thereby causing rotation of the armrest in a first direction about a pivot point on the backrest, which facilitates folding of the armrest with respect to the backrest. Further, the movement of the backrest from the folded position to the seating position results in rotation of the armrest in a second direction about a pivot point on the backrest, which facilitates unfolding of the armrest, allowing the user to access the armrest.

In an embodiment, the first direction can be an upward direction and the second direction can be a downward direction.

In an embodiment, once the backrest moves to the seating position, the armrest can become substantially horizontal and the pivot point on the backrest can be configured to restrict the movement of the armrest in the second direction from the substantially horizontal position and allow the movement of the armrest between the substantially horizontal position and a substantially vertical position where the armrest comes in line with the backrest.

In an embodiment, once the backrest moves to the folded position, the armrest can become substantially parallel to the backrest.

Figure 2:
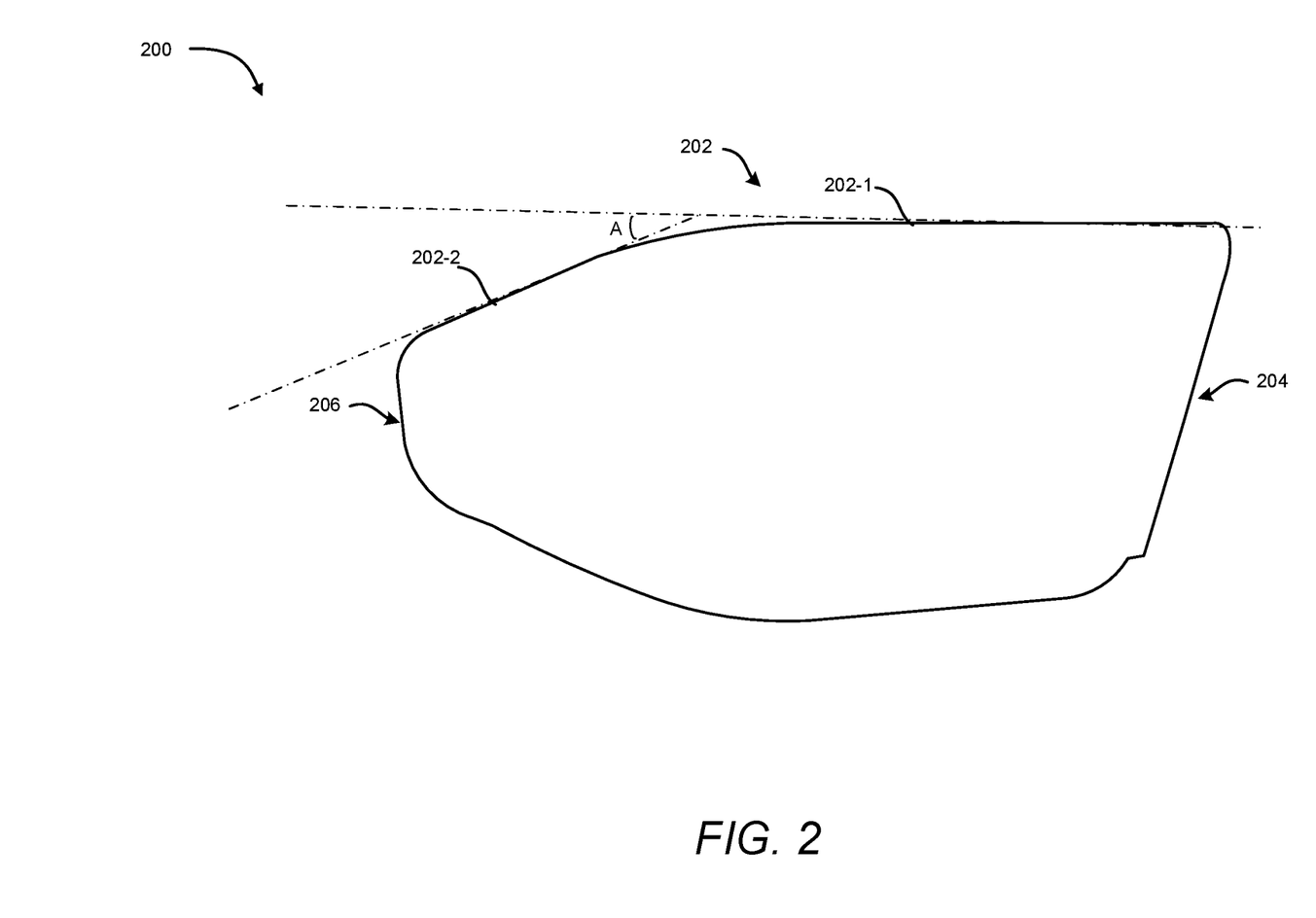
FIG. 2 illustrates an exemplary view of the self-guiding member for the armrest of the proposed automotive seat, in accordance with an embodiment of the present disclosure.

Referring to FIG. 2, an exemplary view of a self-guiding member 200 for the armrest of the proposed seat is disclosed. Further, referring to FIGS. 3A and 3B, an exemplary view of a proposed seat 300 configured with the self-guiding member 200 of FIG. 2, in a seating position and a loading position, respectively, is disclosed.

Figure 3A:
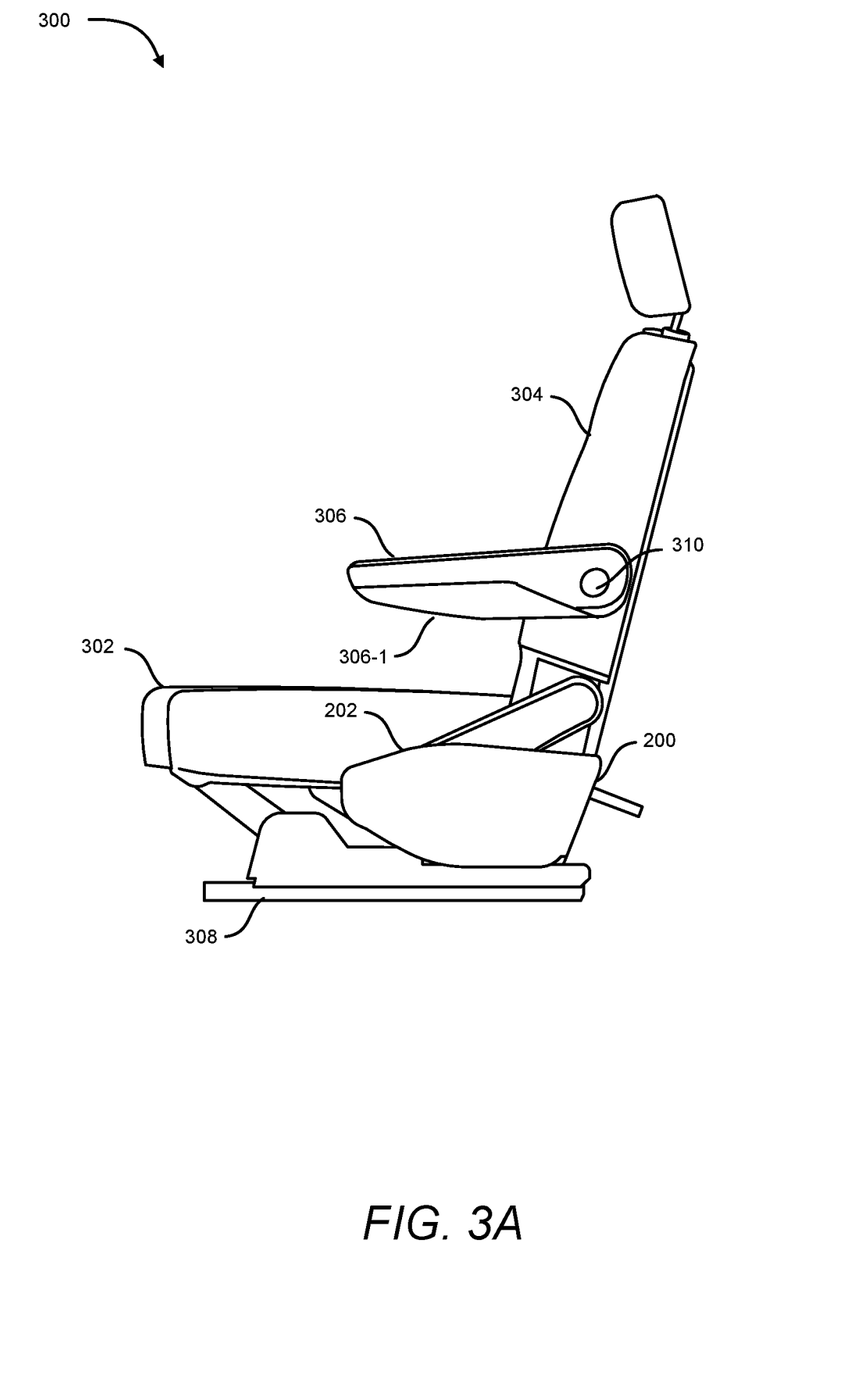
FIGS. 3A and 3B illustrate an exemplary view of the proposed seat configured with the self-guiding member, in a seating position and a loading position, respectively, in accordance with an embodiment of the present disclosure.
Figure 3B:
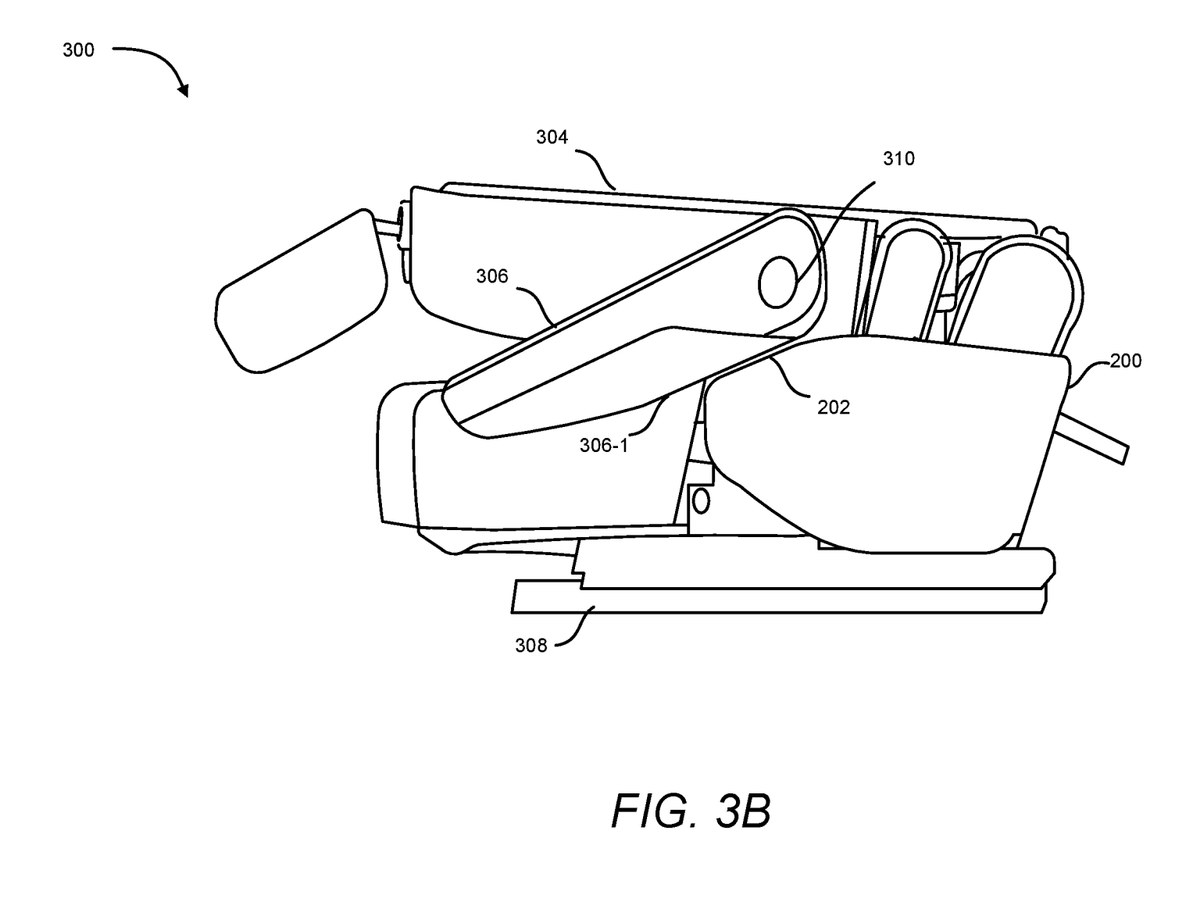
Figure 4A:
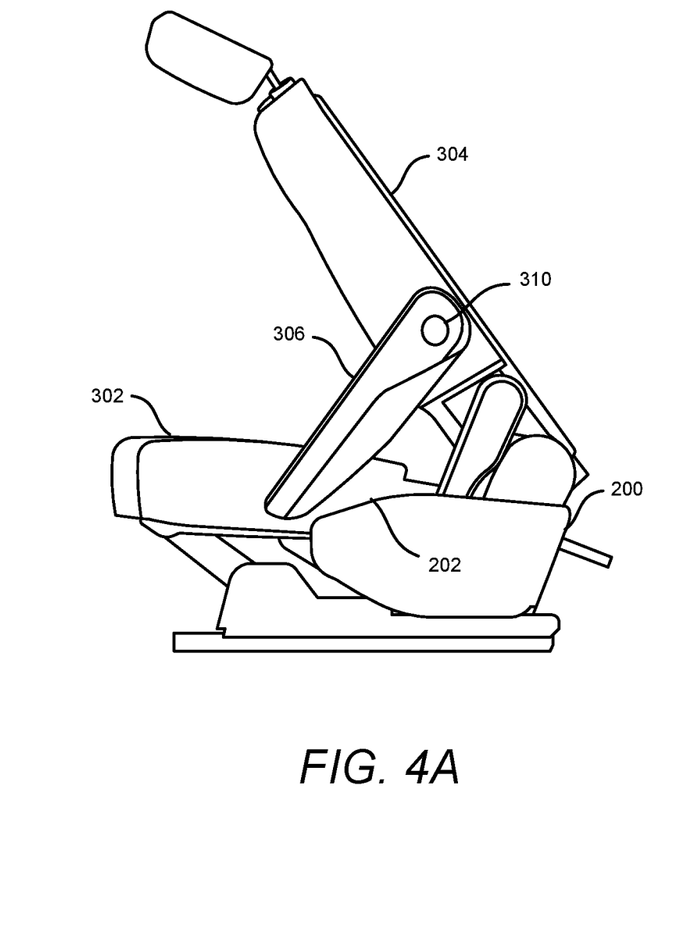
FIGS. 4A to 4D illustrate exemplary views depicting the folding process and positions of the proposed seat having the self-guiding member, in accordance with an embodiment of the present disclosure.
Figure 4B:
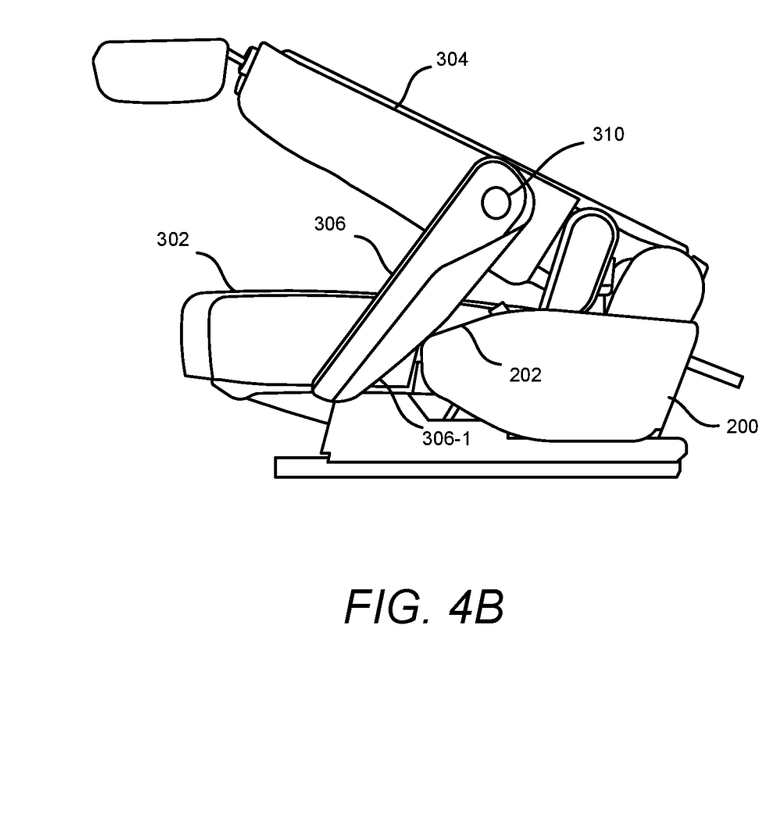
Figure 4C:
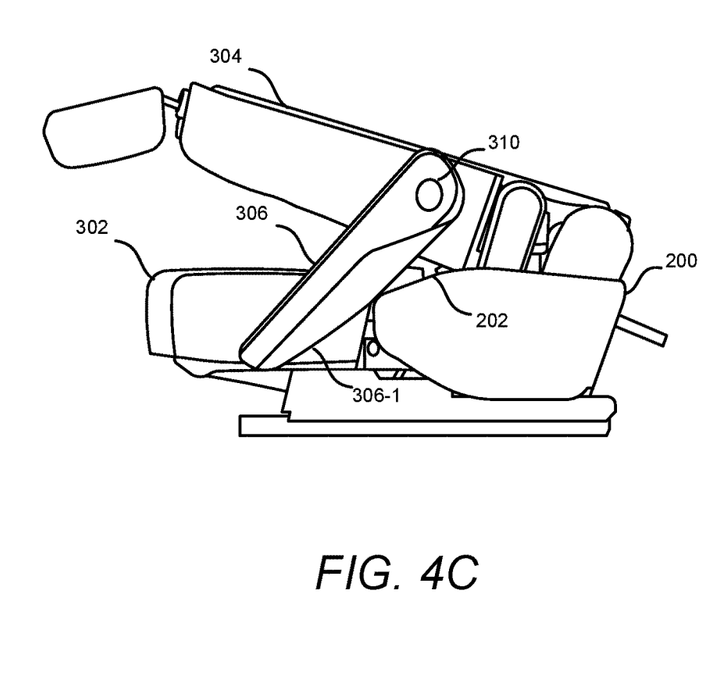
Figure 4D:
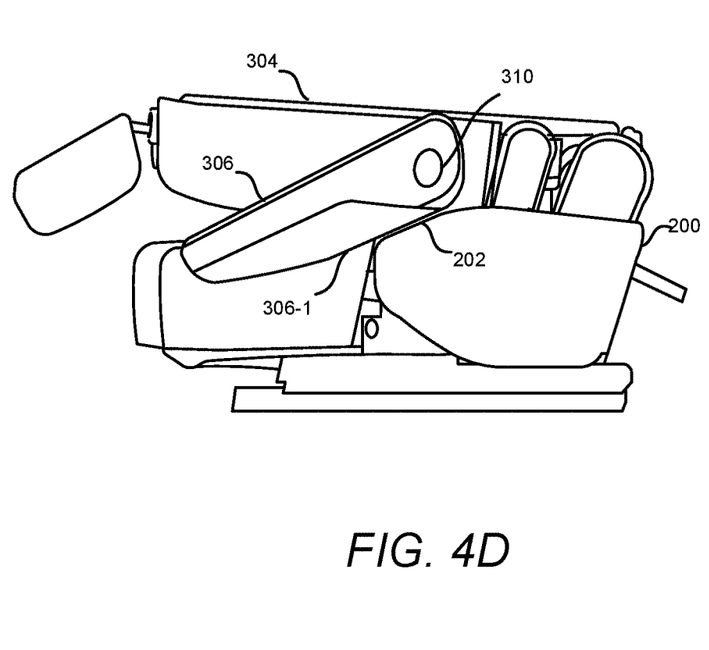

As illustrated, the self-guiding member 200 (also referred to as a guiding member 200 or shield 200, herein) can be coupled on each side of a seat bottom 302 of the seat 300 such that the guiding member 200 does not obstruct the movement of a backrest 304 and the seat bottom 302 of the seat. The backrest 304 can be foldably coupled to the seat bottom 302 and their connection point can be hidden and shielded by the attached guiding member 200. Further, the seat 300 can include an armrest 306 pivotally coupled to each side of the backrest 304. The guiding member 200 can include an upper surface 202 having a predefined profile complementary to a profile of a bottom surface 306-1 of the armrest 306, such that folding of the backrest 304 towards the seat bottom 302 results in sliding of the bottom surface 306-1 of the armrest 306 over the upper surface 202 of the guiding member, which facilitates automated folding of the armrest 306 with respect to the backrest 304 and restricting contact of the armrest 306 with a floor 308 beneath.

In an embodiment, as shown in FIG. 2, the upper surface 202 of the guiding member can include a first surface 202-1 oriented substantially parallel to a length of the seat bottom 302, and a second surface 202-2 inclined at a first predefined acute angle (A) with respect to an axis of the first surface 202-1. The first surface 202-1 extends towards a first end 204 of the guiding member 200 that is connected to the seat bottom 302 and the second surface 202-2 extends from the first surface 202-1 towards a second end 206 (opposite to the first end 204) of the guiding member 200. The second surface 202-2 of the guiding member 200 can be inclined at the first predefined angle (A) with respect to the first surface 202-1 such that a smooth curved profile is created between the first surface 202-1 and the second surface 202-2. Further, at least a portion of the bottom surface 306-1 of the armrest 306 can also have a curved profile that can be adapted to come in contact and slide along the second surface 202-2 of the guiding member 200.

In an embodiment, the guiding member 200 can be made of plastic, or fiber, but is not limited to the like. In another embodiment, the guiding member 200 can be made of the same material used in the bottom surface 306-1 of the armrest 306.

The backrest 304 of the seat 300 can be foldably coupled to the seat bottom 302 and configured to move between a folded position (also referred to as loading position) and an unfolded position (also referred to as seating position). As shown in FIG. 3B, the folded position corresponds to a position where the backrest 304 and the seat bottom 302 become substantially parallel or an inner surface of the backrest 304 comes in contact with an upper surface of the seat bottom 302. In one embodiment, when the proposed seat 300 is implemented in a vehicle, the backrest 304 can be configured to be moved towards the fixed seat bottom 302 to allow the user of the vehicle to increase or extend the loading area in the vehicle. In another embodiment (not shown), when the seat 300 is implemented in a public place, stations, theatre, movie hall, and the like, the seat bottom 302 can be configured to be moved or lifted towards the backrest 304, which helps provide additional space or passage for users to move beside the folded seats 300. Further, as shown in FIG. 3A, the seating position corresponds to a position where the inner surface of the backrest 304 moves away from the upper surface of the seat bottom 302 such that the backrest 304 gets inclined at a second predefined angle from the horizontal seat bottom 302, thereby allowing the user to access and sit on the seat bottom 304.

FIGS. 4A to 4D illustrate exemplary views depicting the folding process and positions of the seat of FIGS. 3A and 3B. In an operation, the movement of the backrest 304 towards the folded position results in sliding of the bottom surface 306-1 of the armrest 306 over the upper surface 202 (in a direction from the first end 204 towards the second end 206) of the guiding member 200, thereby causing rotation of the armrest 306 in a first direction (upward direction) about a pivot point 310 on the backrest 304 or causing movement of the free end of the armrest 306 towards the backrest 304, which facilitates folding of the armrest 306 with respect to the backrest 304. In another operation, the movement of the backrest 304 from the folded position to the seating position again results in sliding of the bottom surface 306-1 of the armrest 306 over the upper surface 202 (but in a direction from the second end 206 towards the first end 204) of the guiding member 200, thereby causing rotation of the armrest 306 in a second direction (downward direction) about the pivot point 310 on the backrest 304 or causing movement of the free end of the armrest 306 away from the backrest 304 up to a substantially horizontal position, which facilitates unfolding of the armrest 306 and allows the user to access the armrest 306.

In an embodiment, the pivot point 310 on the backrest 304 is configured to restrict the movement of the armrest 306 in the second direction (downward direction towards the seat bottom 302) from the substantially horizontal position, once the backrest 304 moves to the seating position. In another embodiment, the pivot point 310 on the backrest 304 is configured to allow the movement of the armrest 306 between the substantially horizontal position and a substantially vertical position where the armrest 306 comes in line with the backrest 304, once the backrest 304 moves to the seating position.

Thus, the unique profile of the upper surface 202 of the guiding member 200 enables automated and complete folding and unfolding of the armrest 306 while moving the seat 300 between the loading position and seating position, respectively, without requiring any additional mechanism. Additionally, the armrest 306 does not get obstructed by the floor 308 or carrier beneath the seat 300 or with other parts of the seat 300, thereby preventing the armrest 306 as well as the seat 300 from any damage.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

I claim:

1. An automotive seat comprising:
a backrest foldably coupled to a seat bottom;
at least one armrest pivotally coupled to one side of the backrest, wherein the at least one armrest has a bottom surface; and
at least one guiding member coupled to one side of the seat bottom, the at least one guiding member comprising an upper surface, and wherein folding of the backrest towards the seat bottom results in sliding of the bottom surface of the at least one armrest over the upper surface of the at least one guiding member, which facilitates folding of the at least one armrest with respect to the backrest and restricting contact of the at least one armrest to a floor of a vehicle,
wherein the upper surface of the at least one guiding member comprises: a first surface oriented substantially parallel to a length of the seat bottom; and a second surface inclined at a first predefined acute angle with respect to an axis of the first surface, wherein the first surface extends towards a first end of the at least one guiding member that is connected to the seat bottom and the second surface extends from the first surface towards a second end of the at least one guiding member.

2. The automotive seat according to claim 1, wherein the second surface is inclined at the first predefined acute angle with respect to the first surface such that a smooth curved profile is created between the first surface and the second surface, and wherein at least a portion of the bottom surface of the at least one armrest has a curved profile that is adapted to come in contact and slide with the second surface of the at least one guiding member.

3. The automotive seat according to claim 1, wherein the backrest is configured to move between a folded position and a seating position, wherein the folded position corresponds to a position where the backrest and the seat bottom become substantially parallel, and the seating position corresponds to a position where the backrest is inclined at a second predefined angle relative to the seat bottom.

4. The automotive seat according to claim 3, wherein the movement of the backrest towards the folded position results in sliding of the bottom surface of the at least one armrest over the upper surface of the at least one guiding member, thereby causing rotation of the at least one armrest in a first direction about a pivot point, which facilitates folding of the at least one armrest with respect to the backrest.

5. The automotive seat according to claim 3, wherein the movement of the backrest from the folded position to the seating position results in rotation of the at least one armrest in a second direction about a pivot point, which facilitates unfolding of the at least one armrest to a substantially horizontal position and allows the user to access the at least one armrest.

6. The automotive seat according to claim 5, wherein movement of the at least one armrest in the second direction about the pivot point from the substantially horizontal position is restricted once the backrest moves to the seating position.

7. The automotive seat according to claim 5, wherein movement of the at least one armrest about the pivot point between the substantially horizontal position and a substantially vertical position is allowed where the at least one armrest comes in line with the backrest.

8. The automotive seat according to claim 3, wherein once the backrest moves to the folded position, the at least one armrest becomes substantially parallel to the backrest.

9. The automotive seat according to claim 1, wherein the upper surface of the at least one guiding member has a predefined profile complementary to a profile of the bottom surface of the at least one armrest.

10. The automotive seat according to claim 1, wherein movement of the backrest to a folded seat position automatically moves the at least one armrest to a folded arm position.

11. The automotive seat according to claim 10, wherein movement of the backrest to an unfolded seat position automatically moves the at least one armrest to an unfolded arm position.

12. The automotive seat according to claim 1, wherein the at least one armrest comprises at least a first armrest pivotally coupled to the one side of the backrest and a second armrest pivotally coupled to an opposite side of the backrest, and wherein the at least one guiding member comprises at least a first guiding member coupled to the one side of the seat bottom and a second guiding member coupled to an opposite side of the seat bottom.

13. A method comprising:
foldably coupling a backrest to a seat bottom;
pivotally coupling at least one armrest to one side of the backrest, wherein the at least one armrest has a bottom surface;
coupling at least one guiding member to one side of the seat bottom, wherein the at least one guiding member has an upper surface; and
automatically moving the at least one armrest to an arm folded position as the backrest is moved to a seat folded position via sliding contact between the bottom surface of the at least one armrest and the upper surface of the at least one guiding member, and
providing the upper surface of the at least one guiding member with a first surface oriented substantially parallel to a length of the seat bottom, and a second surface inclined at a first predefined acute angle with respect to an axis of the first surface, wherein the first surface extends towards a first end of at least one guiding member that is connected to the seat bottom and the second surface extends from the first surface towards a second end of the at least one guiding member.

14. The method according to claim 13, including automatically moving the at least one armrest to an unfolded arm position as the backrest is moved to an unfolded seat position.

15. The method according to claim 13, wherein the upper surface of the at least one guiding member has a predefined profile complementary to a profile of the bottom surface of the at least one armrest.

16. The method according to claim 13, wherein the second surface is inclined at the first predefined acute angle with respect to the first surface such that a smooth curved profile is created between the first surface and the second surface, and wherein at least a portion of the bottom surface of the at least one armrest has a curved profile that is adapted to come in contact and slide with the second surface of the at least one guiding member.

17. The method according to claim 13, including moving the backrest towards the seat folded position to slide the bottom surface of the at least one armrest against the upper surface of the at least one guiding member, which rotates the at least one armrest in a first direction about the pivot point toward the backrest, and moving the backrest towards a seat unfolded position to slide the bottom surface of the at least one armrest against the upper surface of the at least one guiding member, which rotates the at least one armrest in a second direction about the pivot point away from the backrest.

18. An automotive seat comprising:
a backrest foldably coupled to a seat bottom;
at least one armrest pivotally coupled to one side of the backrest, wherein the at least one armrest has a bottom surface; and
at least one guiding member coupled to one side of the seat bottom, the at least one guiding member comprising an upper surface, and wherein folding of the backrest towards the seat bottom results in sliding of the bottom surface of the at least one armrest over the upper surface of the at least one guiding member, which facilitates folding of the at least one armrest with respect to the backrest and restricting contact of the at least one armrest to a floor of a vehicle,
wherein the backrest is configured to move between a folded position and a seating position, wherein the folded position corresponds to a position where the backrest and the seat bottom become substantially parallel, and the seating position corresponds to a position where the backrest is inclined at a second predefined angle relative to the seat bottom,
wherein the movement of the backrest from the folded position to the seating position results in rotation of the at least one armrest in a second direction about a pivot point, which facilitates unfolding of the at least one armrest to a substantially horizontal position and allows the user to access the at least one armrest, and
wherein movement of the at least one armrest in the second direction about the pivot point from the substantially horizontal position is restricted once the backrest moves to the seating position.

19. The automotive seat according to claim 18, wherein the upper surface of the at least one guiding member comprises: a first surface oriented substantially parallel to a length of the seat bottom; and a second surface inclined at a first predefined acute angle with respect to an axis of the first surface, wherein the first surface extends towards a first end of the at least one guiding member that is connected to the seat bottom and the second surface extends from the first surface towards a second end of the at least one guiding member.

20. The automotive seat according to claim 19, wherein the second surface is inclined at the first predefined acute angle with respect to the first surface such that a smooth curved profile is created between the first surface and the second surface, and wherein at least a portion of the bottom surface of the at least one armrest has a curved profile that is adapted to come in contact and slide with the second surface of the at least one guiding member.

* * * * *